(12) United States Patent
    Azim

(10) Patent No.: US 11,836,821 B2
(45) Date of Patent: Dec. 5, 2023

(54) COMMUNICATION SYSTEM FOR MOTORISTS

(71) Applicant: Malik Azim, Oakland, CA (US)

(72) Inventor: Malik Azim, Oakland, CA (US)

( * ) Notice: Subject to any disclaimer, the term of this patent is extended or adjusted under 35 U.S.C. 154(b) by 0 days.

(21) Appl. No.: 16/932,871

(22) Filed: Jul. 20, 2020

(65) Prior Publication Data

US 2021/0004928 A1     Jan. 7, 2021

Related U.S. Application Data

(63) Continuation-in-part of application No. 15/598,154, filed on May 17, 2017, now abandoned.

(51) Int. Cl.
    *G06Q 50/26* (2012.01)
    *G06Q 50/18* (2012.01)
    *H04N 7/18* (2006.01)

(52) U.S. Cl.
    CPC .......... *G06Q 50/265* (2013.01); *G06Q 50/18* (2013.01); *H04N 7/183* (2013.01); *H04N 7/188* (2013.01)

(58) Field of Classification Search
    None
    See application file for complete search history.

(56) References Cited

U.S. PATENT DOCUMENTS

| 2013/0086109 | A1* | 4/2013 | Huang | G06F 16/487 |
| | | | | 707/E17.014 |
| 2016/0104198 | A1* | 4/2016 | Smith | G06Q 30/0267 |
| | | | | 705/14.55 |
| 2018/0025453 | A1* | 1/2018 | Redmon | H04L 65/1069 |
| | | | | 348/14.02 |
| 2018/0336651 | A1* | 11/2018 | Azim | G06Q 50/18 |
| 2019/0272743 | A1* | 9/2019 | Henry | H04W 4/029 |
| 2020/0186707 | A1* | 6/2020 | Mallet | G06Q 50/18 |
| 2021/0051295 | A1* | 2/2021 | Khawam | G06Q 50/18 |

* cited by examiner

Primary Examiner — Scott A Zare
(74) Attorney, Agent, or Firm — The Law Office of Herbert T. Patty

(57) ABSTRACT

The present invention relates to a system and method for motorists which can be employed during law enforcement investigations. The method includes receiving an indication that a motorist is being investigated by law enforcement. The method further includes presenting options of available legal counsel to the motorist during the law enforcement investigation. Next, the method includes facilitating a selection of a legal counsel of the available legal counsel options to represent the motorist during the law enforcement investigation. Furthermore, the method includes creating a first channel of communication between law enforcement and the motorist's legal counsel.

19 Claims, 7 Drawing Sheets

COMMUNICATION SYSTEM FOR MOTORISTS

CROSS REFERENCE TO RELATED APPLICATIONS

This patent application claims the benefit of U.S. Provisional Ser. No. 62/436,504 filed Dec. 20, 2016 under 35 U.S.C. § 119(e) and further claims the benefit of U.S. Non-Provisional Ser. No. 15/598,154 filed May 17, 2017 under 35 U.S.C. § 120 which is incorporated by reference herein.

FIELD

The present invention relates to a novel communications system for motorists which can be employed during law enforcement investigations.

BACKGROUND

High-profile police killings of unarmed African Americans and the protests that precipitate therefrom have caused the public to reconsider the wide latitude of authority given to police officers. Although many Americans are subjected to police misconduct, African Americans have been systematically mistreated. In the estimation of several experts, a key factor contributing to the victimization of African Americans is the presence of negative sentiments of African Americans in law enforcement.

Traffic stops are the most common interaction that motorists have with law enforcement and therefore play a central role in forming public perceptions. Frequent stops for minor traffic violations, especially if followed by a search of a motorist's vehicle, sends a message to communities of color that they are perceived as potential suspects.

A recent study concluded that African Americans are nearly twice as likely to be pulled over as other Americans and about four times as likely to be searched. Therefore, a need exists for a communications system for motorists that can be employed during law enforcement investigations.

BRIEF DESCRIPTION OF THE DRAWINGS

To facilitate understanding, identical reference numerals have been used, wherever possible, to designate identical elements that are common to the figures. The drawings are not to scale and the relative dimensions of various elements in the drawings are depicted schematically and not necessarily to scale. The techniques of the present invention may readily be understood by considering the following detailed description in conjunction with the accompanying drawings, in which.

DETAILED DESCRIPTION

Before the present invention is described in detail, it is to be understood that, unless otherwise indicated, this disclosure is not limited to specific procedures or articles, whether described or not.

It is further to be understood that the terminology used herein is for the purpose of describing particular embodiments only and is not intended to limit the scope of the present invention.

It must be noted that as used herein, and in the claims, the singular forms "a," and "the" include plural referents unless the context clearly dictates otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure. The term "about" generally refers to ±10% of a stated value.

The present invention relates to a communications system and method for motorists to be employed during law enforcement investigations. The method includes receiving an indication that a motorist is being investigated by law enforcement. The method further includes presenting options of available legal counsel. Next, the method includes facilitating a selection of legal counsel of available legal counsel options to represent the motorist during the law enforcement investigation. Further, the method includes creating a first channel of communication between law enforcement and the motorist's legal counsel.

Herein, a traffic stop is defined as a temporary detention of a motorist by law enforcement to investigate a possible crime or minor violation of law. An investigative stop, or terry stop, is defined as a brief detention. Notably, for investigative stops, law enforcement must have a reasonable suspicion that a suspect is engaged in criminal activity in order to justify the temporary stop. A detention occurs whenever a police officer accosts an individual and restricts his or her freedom when suspected of being involved in criminal activity.

Figure 1:
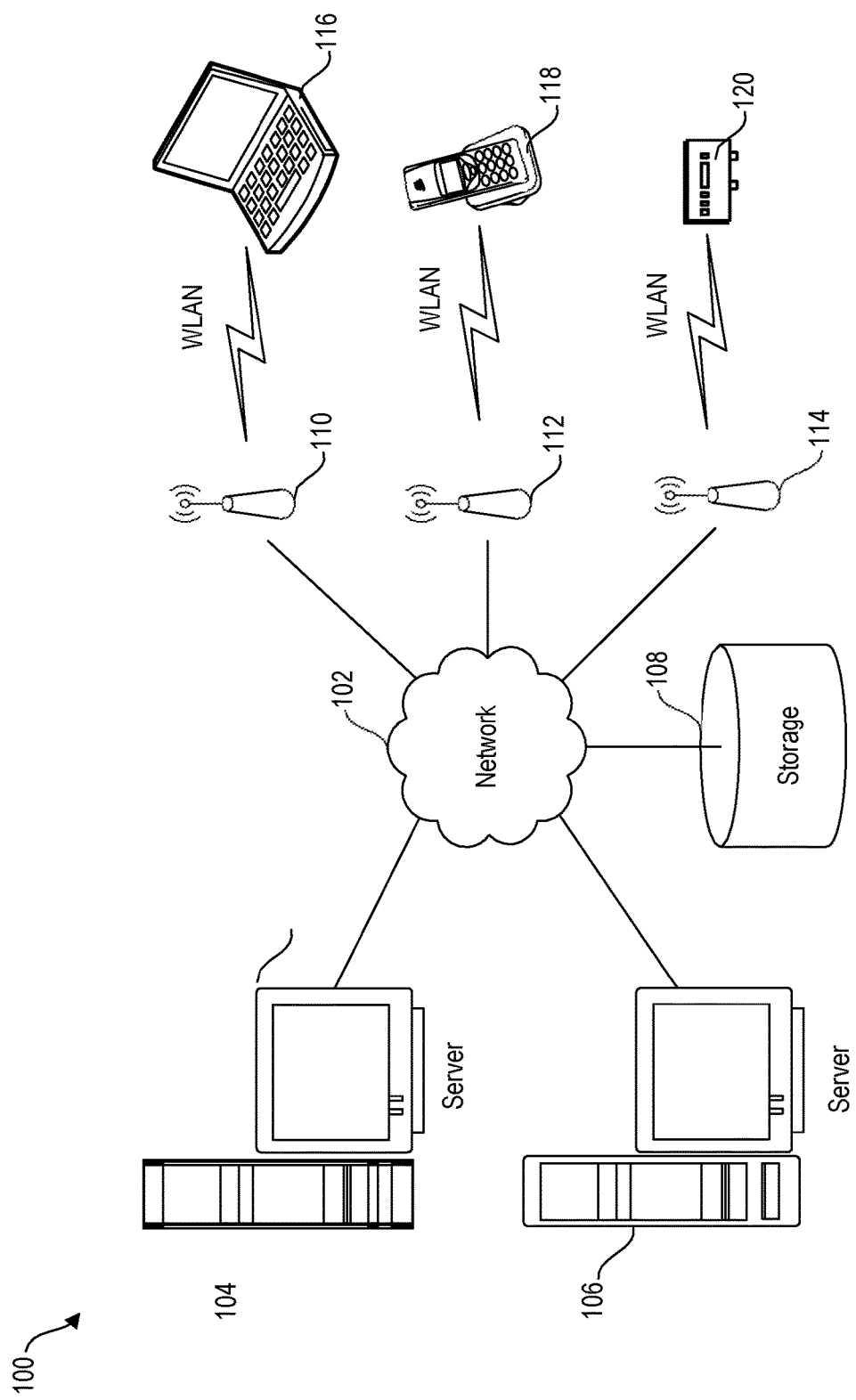
FIG. 1 is an example computer network system according to one or more examples of the present invention.

FIG. 1 is an example computer network system 100 according to one or more examples of the present invention. Computer network system 100 is a network of data processing systems, such as, for example, computers and other devices, in which the illustrative embodiments may be implemented. One or more client devices employed within computer network system 100 may include a display screen, a plurality of microprocessors, and memory.

Computer network system 100 may include one or more networks which provide communication links between the various computers and other devices connected together within the computer network system 100. In some implementations, network 102 may include connections, such as wire(s), wireless communication links, or fiber optic cables.

In the example depicted in computer network system 100, a server 104, server 106, and storage unit 108 are all connected to network 102. Storage unit 108 may be capable of storing data in a structured or unstructured format. Additionally, storage unit 108 may represent a plurality of storage units coupled to network 102. In some implementations of the present invention, the storage unit 108 may, for example, include any database within an enterprise that stores and manages reusable software assets and any other data related to these reusable software assets. Access Points 110, 112, and 114 may function as a network device that allows client devices to connect to a wired network. In some implementations, an access point may connect to a router as a standalone device but may also be an integral component of the router itself in some implementations.

In addition, the access points 110, 112, 114 may provide wireless access to client devices 116, 118, 120. The client devices may include personal computers, network computers, laptop computers, hand-held computers, personal digital assistants (PDAs), or smart cellular telephones (e.g., smartphones). However, one having ordinary skill in the art should appreciate that the present invention is not limited to the client devices is not limited to the aforementioned devices.

In the implementation shown, access points 110, 112, and 114 are clients to server 104 and/or server 106. In addition, server 104 and/or server 106 may provide data, such as, for example, boot files, operating system images, and applications to access points 110, 112, and 114. In an example implementation, servers 104, 106 can connect central communications units stationed in vehicles such that the system disclosed herein can send and receive communications such as, but not limited to, attorney profiles, vehicle addresses, distress signals, etcetera. Moreover, computer network system 100 may include additional servers, clients, and other devices not shown to implement processes of illustrative implementations.

Computer network system 100 may be implemented as a number of different types of networks, such as, for example, an intranet, a local area network (LAN), a wide area network (WAN), or the Internet. Also, it should be noted that FIG. 1 is only intended as an example and not as an architectural limitation for the different illustrative implementations. For example, illustrative implementations may be implemented within a single data processing system or within a computer network system.

Figure 2:
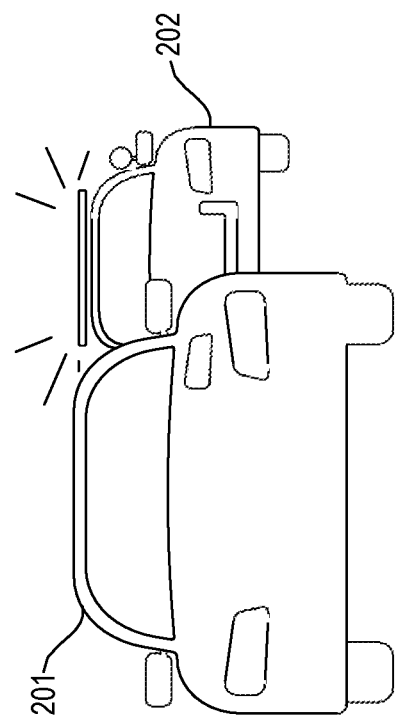
FIG. 2 is an illustration of a motorist prior to a traffic stop according to one or more examples of the present invention.

FIG. 2 is an illustration of a motorist prior to a traffic stop according to one or more examples of the present invention. As shown, a motorist's vehicle 201 is being tailed by a police car 202 prior to a traffic stop. Advantageously, the present invention provides for the motorist to be informed of the police car's 202 presence or location prior to a traffic stop. The present invention further provides a motorist a means to identify legal counsel to represent them during its interaction with law enforcement.

Most notably, the present invention can reduce the risk of escalated interactions between law enforcement and motorists. Advantageously, legal counsel (e.g., criminal defense attorneys) can represent its client motorists remotely by communicating directly with law enforcement personnel and further communicating directly with its client motorists to inform them of their rights during law enforcement investigations (e.g., traffic stops, investigative stops, or detentions). As such, the present invention can facilitate motorists to exercise its $6^{th}$ Amendment right to counsel during law enforcement investigations.

Additionally, the present invention may incorporate a system which identifies legal counsel to potentially represent a motorist according to its present location. In some implementations, each legal counsel within the system's database may indicate the location of a legal counsel's business address, area of practice, and jurisdictions that the legal counsel is authorized to practice. For example, if a motorist is presently driving in Oakland, California each criminal defense attorney in Oakland, California or Alameda County, depending on system settings, may receive a notification if the motorist needs legal counsel. The legal counsel may also have access to the software system and can make an election if they agree to receive notifications. More specifically, each legal counsel can elect to receive notifications for specific matters (e.g., traffic stops) and for specific regions.

For example, if an attorney with access to the software system disclosed herein elects to receive notifications for traffic stops in Oakland, CA, the attorney may receive the notifications based on its proximity to the detention location. In some implementations, the software system described herein may receive preferences to represent the motorist based on a round-robin, random selection, or other suitable methods known in the art.

The software system may operate continuously to identify potential legal counsel even without an explicit request from motorists or in response to a detection that a law enforcement investigation has occurred. However, it should be understood by those having ordinary skill in the art that the present invention is not limited to legal counsel as licensed attorneys. In some implementations, legal counsel may be non-attorneys, such as, but not limited to, paralegals. However, for non-attorney legal counsel, they may advise the motorists of their rights prior to or during the law enforcement investigation in a manner that does not interfere with the investigation and in a manner that does not constitute the unauthorized practice of law. The non-attorney counsel may serve as an observer or witness to law enforcement investigation.

A software system consistent with the present invention can facilitate various account options. For example, the software system described herein may provide a basic subscriber account which gives motorists access to legal counsel for representation during law enforcement investigations. In addition, a premium subscription account can give motorists access to other services such as, but not limited to, legal counseling, a personal attorney, legal representation in a court of law, etcetera.

Figure 3:
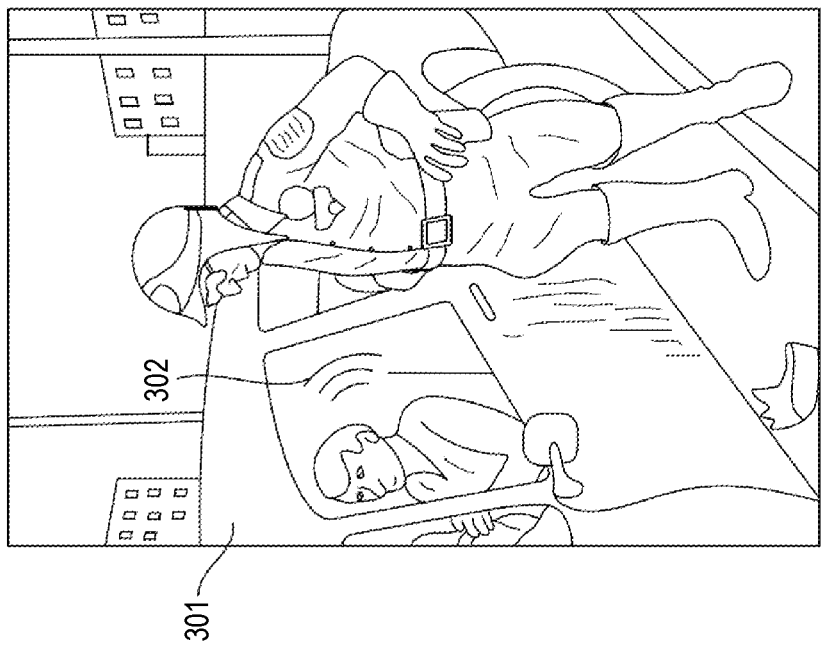
FIG. 3 is an illustration of a system for engaging with law enforcement during a traffic stop according to one or more examples of the present invention.

FIG. 3 is an illustration of a system for engaging with law enforcement during a traffic stop according to one or more examples of the present invention. As shown, a member of law enforcement has approached a motorist's vehicle possibly for an alleged traffic violation. Notably, upon approaching a motorist's driver-side window, the motorist's legal counsel can communicate with law enforcement to inform the officer that the motorist is represented by legal counsel in the present matter. Basic information regarding the motorist's vehicle registration, motorist's insurance, driver's license number, vehicle's VIN number, etcetera can be supplied to law enforcement by the motorist's legal counsel. Accordingly, the present invention can reduce the opportunity for physical interactions between motorists and law enforcement.

In some implementations, an insignia of the software system consistent with the present invention may be stationed on an external area of the vehicle 301. For example, the indicia 303 may be a decal with a QR code which embeds information about the motorist and its vehicle. For example, the motorist's driver's license number, vehicle registrations, motorist insurance, etcetera may be retrieved by a law enforcement officer without a formal request from the motorist. In some implementations, the indicia 303 may refract light in a manner to glow during the day or engage a light at night to indicate to the pubic and to law enforcement that the motorist's vehicle is equipped with the functionality disclosed herein.

As will be discussed in detail herein, the motorist's legal counsel may communicate with law enforcement in various ways. For example, the motorist may have a central communications unit (as will be further described below) stationed within the vehicle 301 which can facilitate audible transmissions 302 from the motorist's legal counsel to law enforcement. In this example, the motorist may overhear a conversation between law enforcement and its legal counsel. However, the present invention is not limited to this implementation as further explained in detail below.

Lastly, in some implementations, if a motorist's legal counsel is unavailable by the time that law enforcement reaches the motorist's driver-side window for questioning, the central communications unit (not shown) may automatically issue a (default) statement from one of the system devices that the motorist is retained by legal counsel and that the motorist's legal counsel will be available shortly. The central communications unit may also be used to advise the motorist of its rights (e.g., Miranda rights, right to counsel, etc.) and may instruct the motorist to remain silent until its legal counsel is available to communicate directly with law enforcement.

Additionally, notifications may be sent to nearby persons (e.g., subscribers of a software system via a software application) to notify them of the motorist's present law enforcement investigation. The nearby subscribers may be prompted to document (e.g., witness notes) its account of the law enforcement investigation, take photos of the scene, or make audio or video recordings of the present investigation.

The nearby motorists may be further prompted to upload (via a software application) the aforementioned evidence associated with the present investigation to a set of servers which hosts the software application. In some embodiments, the aforementioned evidence may be added to the motorist's incident transcript. Accordingly, the nearby subscribers can elect to serve as a witness to the investigation of the motorist. A software application which employs the present invention may facilitate an election of a subscriber to serve as a witness via an option within the software application.

FIGS. 4A-4E are illustrations of a vehicle 400 with system devices which facilitate communication between a motorist, legal counsel, and law enforcement during a traffic stop, investigative stop, or detention. In the embodiment shown, the system devices include central communications unit 401, external video camera 403, dash camera 406, external speaker 407, and radar detector 408. In addition, the motorist's smartphone device 402 may operate as a system device in some implementations.

The central communications unit 401 may be paired to one or more system devices. The central communications unit 401 may establish a network such that one or more network servers may be communicatively coupled to the system devices. As such, the system devices may be accessed and deployed by remote users and systems.

It should be understood by those having ordinary skill in the art that the present invention may include more than or less than the system devices shown in FIG. 4 so long as the present invention enables motorists to access legal counsel during law enforcement investigations and can facilitate communications between the motorist's legal counsel and law enforcement. Furthermore, although the system devices are shown to be discrete devices in the embodiment shown in FIG. 4, for other embodiments, one or more of the system devices may be embodied as distinct functions within the central communications unit 401.

Figure 4A:
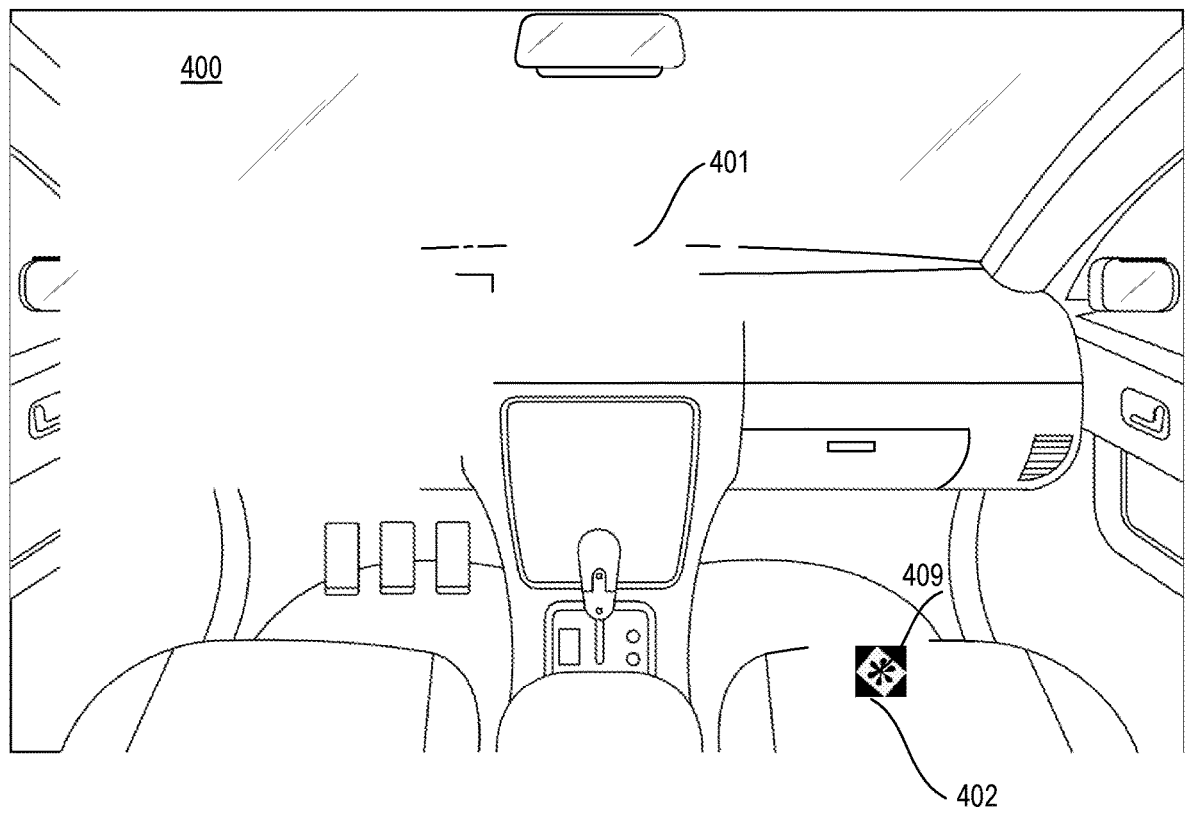
FIGS. 4A-4E are illustrations of a vehicle with system devices which facilitate communication between a motorist, its legal counsel, and law enforcement during a traffic stop, investigative stop, or detention.

FIG. 4A shows the front area of the vehicle 400. As shown, the central communications unit 401 is mounted on top of a dashboard within the vehicle 400. The central communications unit 401 may include router circuitry to receive and transmit packets of information to and from an external server or system device. In some embodiments, the central communications unit 401 is communicatively coupled to one or more servers and one or more system devices. In addition to smartphone device 402, the system devices may include at least one device which can facilitate voice calls.

Furthermore, the central communications unit 401 may receive an indication that a motorist is about to be detained or is being detained by law enforcement for an investigation. The central communications unit 401 may receive the indication by an audible, hands-free command or by way of manual input by the motorist or passenger. For example, if a motorist observes the presence of nearby law enforcement, the motorist can utter a voice command (e.g., "find local counsel") in lieu of an impending traffic stop.

Figure 4B:
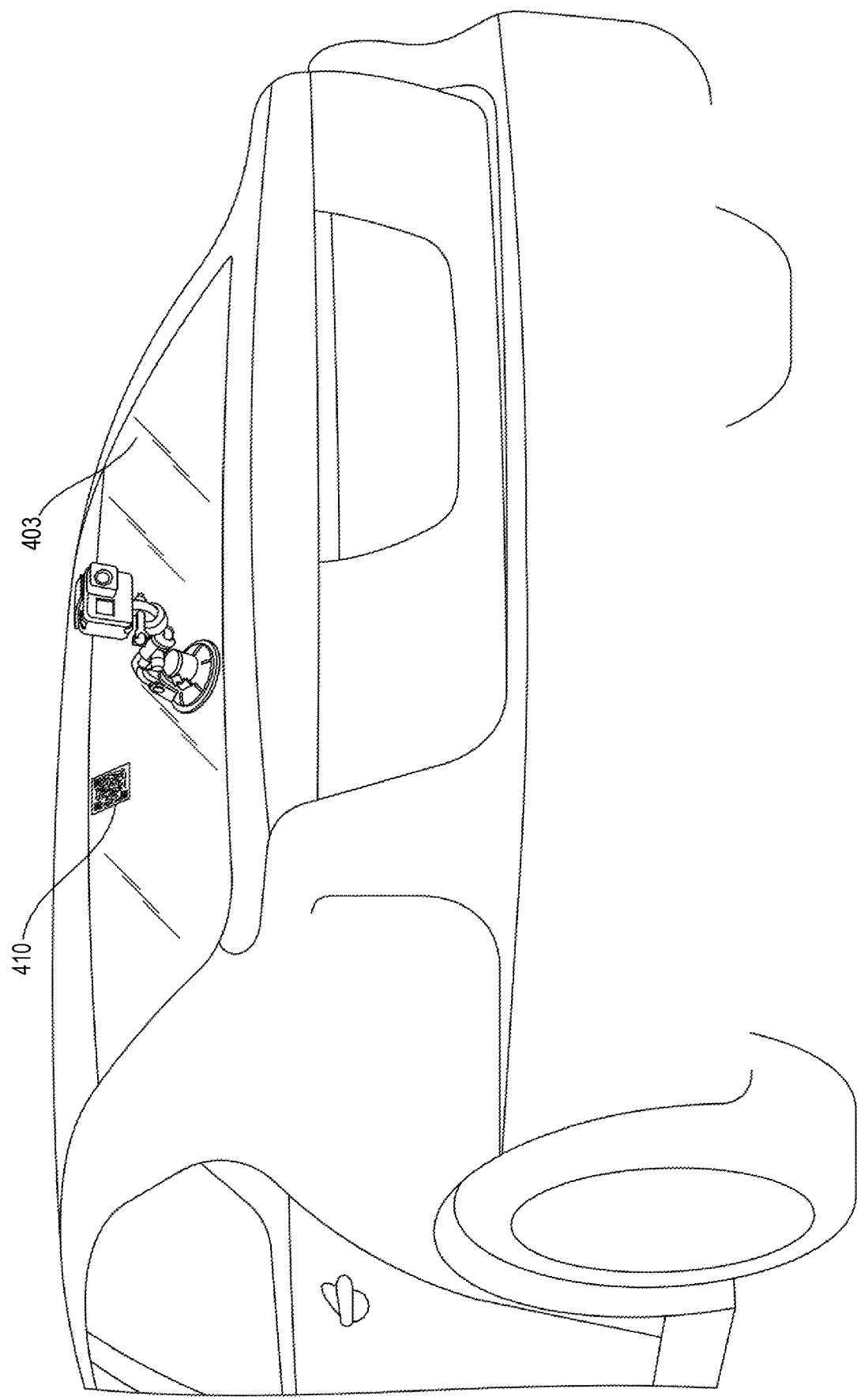
Figure 4C:
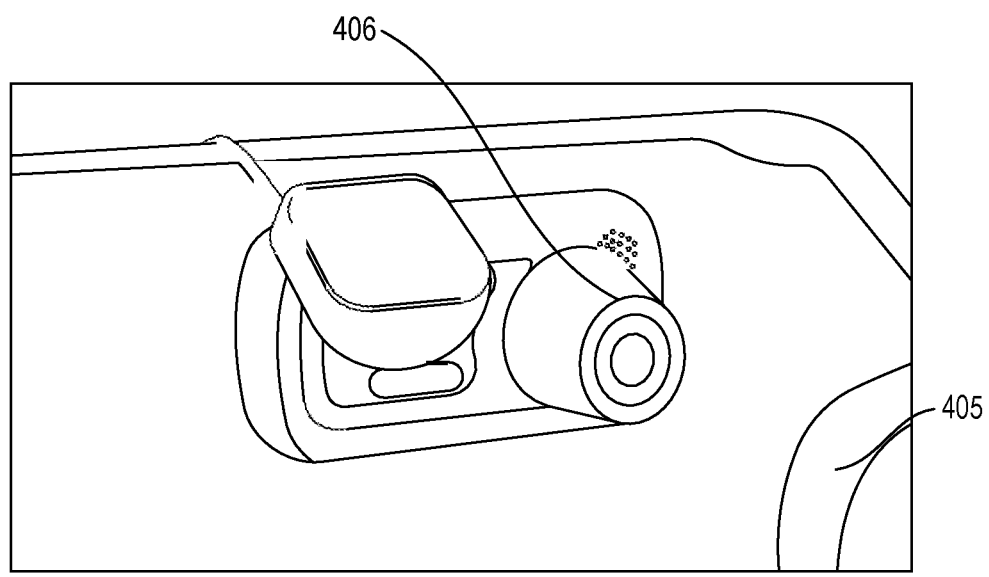
Figure 4D:
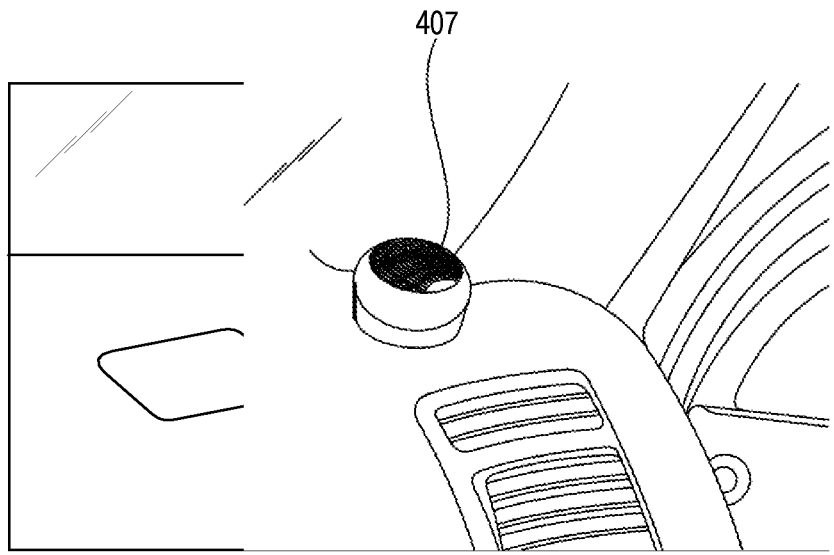
Figure 4E:
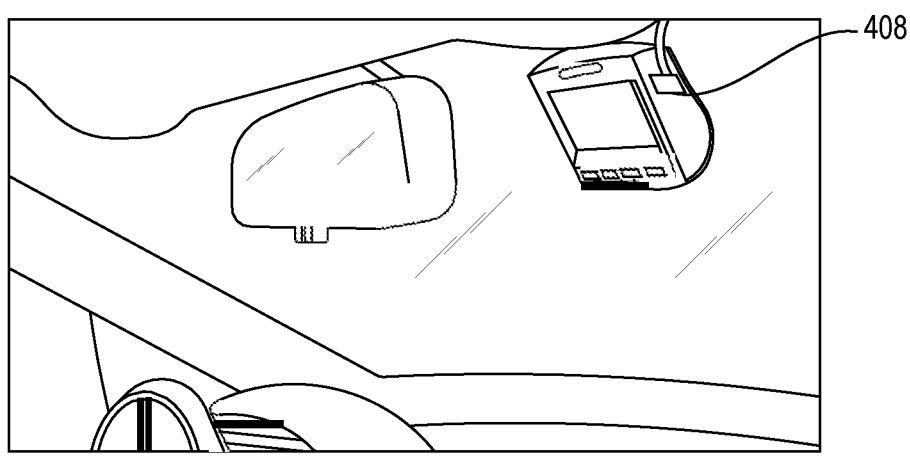

In other implementations, the central communications unit 401 may be enabled with radar detection functionality or may be paired to a radar detector 408 system device (see FIG. 4E). The radar detector 408 may detect whether a motorist's speed is being monitored by law enforcement and therefore can detect the presence of nearby law enforcement.

In yet another implementation, mobile Internet allows the central communications unit 401, which may be equipped with GPS navigation capability, to map law enforcement locations in real-time. Moreover, the central communications unit 401 may have access to external software systems. For example, the central communications unit 401 may have access to software applications which render a live traffic map and to the present location of law enforcement which may be shared by other motorist subscribers of the software system.

Additionally, smartphone device 402 may host a software application 409 which facilitates a means for motorists to seek legal counsel and can readily inform the public of law enforcement investigations in real time. For example, a motorist may indicate, via the software application 409, that the motorist is being presently detained by law enforcement. In some implementations, the smartphone device 402 hosts one or more software applications which can send notifications to a motorist's contact list regarding the motorist's present detention.

In some implementations, the central communications unit 401 may include wireless capability to enable a connection to the Internet. In addition, the central communications unit 401 can facilitate a first channel of communication between law enforcement and the motorist's legal counsel. The central communications unit 401 can also facilitate a second channel of communication between the motorist and its legal counsel.

In one implementation, the first channel of communication may be facilitated by the central communications unit's 401 employment of an external speaker 407 to output communications from the motorist's legal counsel to law enforcement. However, in other implementations, the central communications unit 401 is equipped with speaker components. Notably, the external speaker 407 may be stationed internally or on an exterior of the vehicle 400.

In addition, the second channel of communication may be facilitated by the central communications unit's 401 establishment of a network such that packets of text messages and audible information can be transmitted to one or more system devices. In one implementation, when the second channel of communication is open, the first channel of communication is closed.

In some embodiments, the first channel of communication may provide confidential communication between the motorist and its legal counsel. Moreover, in other implementations, once the motorist's legal counsel has been selected, legal counsel may contact the motorist via a direct call or in-app voice call via smartphone device 402.

Because the central communications unit 401 may have GPS navigation capability and can be paired to external servers which can host subscribers to a software application 409 to facilitate a means for motorists to seek legal counsel during an investigation by law enforcement, the central communications unit 401 or motorist's smartphone device 402 may be used to send messages to nearby subscribers of the software application 409 to create witnesses of the present traffic stop, investigative stop, or detention.

Furthermore, although the central communications unit 401 is shown in FIG. 4A as a discrete device, the present invention is not limited thereto. The central communications unit 401 may be integrated within a vehicle's controls system (not shown) by the vehicle's manufacturer and can perform the aforementioned capabilities previously described. Accordingly, the central communications unit 401 may engage the vehicle's 400 native devices (e.g., horns, lights, speakers, etc.) to carry out one or more functions of the present invention.

Video camera 403 may capture still images of a license plate or other identifying indicia on a law enforcement officer's vehicle. The captured still images may be uploaded and associated with a motorist's incident transcript.

In some implementations, the video camera 403 may be stationed on the vehicle 400 in a manner to capture a vehicle's license plate, or other indicia of law enforcement, and still images of the officers. In an event that a motorist is being unlawfully profiled, the motorist can engage the software system to engage one or more system devices to track the law enforcement vehicle. For example, the motorist's video camera 403 can track the time, distance, speed, etc. that the law enforcement officer is following the motorist's vehicle. Even in the event that a formal law enforcement investigation did not take place during an investigative stop, a motorist can still report occurrences of unlawful profiling.

The collected evidence can be associated with an incident transcript. The motorist may engage the central communications unit 401 to begin tracking a nearby law enforcement vehicle. At the motorist's request, the motorist may request that the incident transcript be created. The motorist may indicate that the incident transcript is a record of an example profiling occurrence which may be automatically added to the incident transcript. The incident transcript may be dispatched to a law enforcement agency upon a motorist's command. For example, the incident transcript may be sent via email or other message format. Machine learning processes may be applied to the incident transcripts of profiles to discover trends. The system devices, such as video cameras 403, may employ image recognition software to identify and track a law enforcement vehicle. Similar to facial recognition, the software application which employs image recognition software may be configured to recognize vehicles, particularly police cars. Automatically, or upon a command issued by a motorist, one or more of the system devices can lock in on nearby law enforcement vehicle.

FIG. 4B is an illustration of an exemplary video camera 403 which may be mounted to an inside or external area of the motorist's vehicle 400. Video camera 403 may be automatically engaged once the central communications unit 401 receives an indication that the motorist will be or is being detained by law enforcement. Accordingly, the central communications unit 401 can send commands to the video camera 403 to engage upon the unit's 401 receipt of the indication. In addition to video camera 403, the system devices may include several camera devices mounted to or affixed to the interior or exterior of the vehicle 400. Therefore, the video cameras 403 can capture still images and video footage of the present investigation.

FIG. 4C is an illustration of a dash camera 406 mounted within a dashboard 405 area of the vehicle 400. The dash camera 406 may be engaged once the central communications unit 401 receives an indication that a motorist is detained by law enforcement. The dash camera 406 may operate in conjunction with video camera 403 and any other system device cameras coupled to vehicle 400. For example, if video camera 403, dash camera 406, and any other system device cameras are capable of tracking, the central communications unit 401 can facilitate the movement of the video cameras in a coordinated manner to effectively capture footage of the investigation.

FIG. 4D is an illustration of an external speaker 407 which may be paired with a central communications unit 401. The external speaker 407 may be used for the motorist's legal counsel to communicate with law enforcement during a traffic stop, investigative stop, or detention.

In addition, the external speaker 407 may emit default messages. For example, the central communications unit 401 may emit a message when the external speaker 407 that the motorist counsel will be available shortly and may inform law enforcement that the motorist will be represented by legal counsel. In addition, the external speaker 407 may emit instructions for law enforcement officers to scan the software system insignia (see FIG. 3) to retrieve motorist's vehicle information (or its vehicle's information). Accordingly, the central communications unit 401 may emit preconfigured audible messages according to default system settings.

Moreover, the system devices may also include a discrete sound receiver device or functionality within central communications unit 401 which can detect and process sound. The sound receiver component within the central communications unit 401 may incorporate conventional devices (e.g., a diaphragm) to detect sound. As such, a motorist can call for aid which can be detected by the central communications unit 401. In turn, the central communications unit 401 can dispatch a distress alert such that aid can arrive at the scene of the investigation to help a motorist in need.

For example, if the motorist is in a remote location, the motorist can utter a distress command such as "help" which the central communications unit 401 can be programmed to detect. The central communications unit 401 can send a distress notification to legal counsel, nearby subscribers, etcetera.

The central communications unit 401 may also engage system devices to engage audio or to visually generate distress alerts as well. In embodiments where the central communications unit 401 is integrated within a vehicle's 400 controls system, the central communications unit 401 can engage other vehicle devices native thereto (e.g., horn or front/rear lights) to generate distress alerts.

The present invention can create networks of central communication units, each of which may be stationed in different vehicles. Each of the central communication units may be coupled to one or more system servers and can therefore communicate with each other. Accordingly, in an event that a motorist is detained for a present law enforcement investigation, nearby motorists (e.g., motorist subscribers) which have access to its central communications unit can engage its system devices in a manner to capture audio or video recordings of the law enforcement investigation when the nearby motorists drive close enough to the scene of the investigation.

When a distress signal is detected by the central communications unit (e.g., via system devices), system software may send messages to nearby motorists to call in an emergency related to the law enforcement investigation. Moreover, in the instance that nearby motorists capture evidence related to the present law enforcement investigation, the evidence can be automatically uploaded to system servers and associated with the incident transcript associated with the motorist that is presently being detained.

Moreover, in some implementations, when the central communications unit 401 detect that a law enforcement investigation is about to occur, the central communications unit 401 sends an alert to other central communications unit 401 stationed in nearby vehicles of the present law enforcement investigation. The statistics obtained from processing the incident transcripts can help determine whether over-policing of a particular region has occurred.

Figure 5:
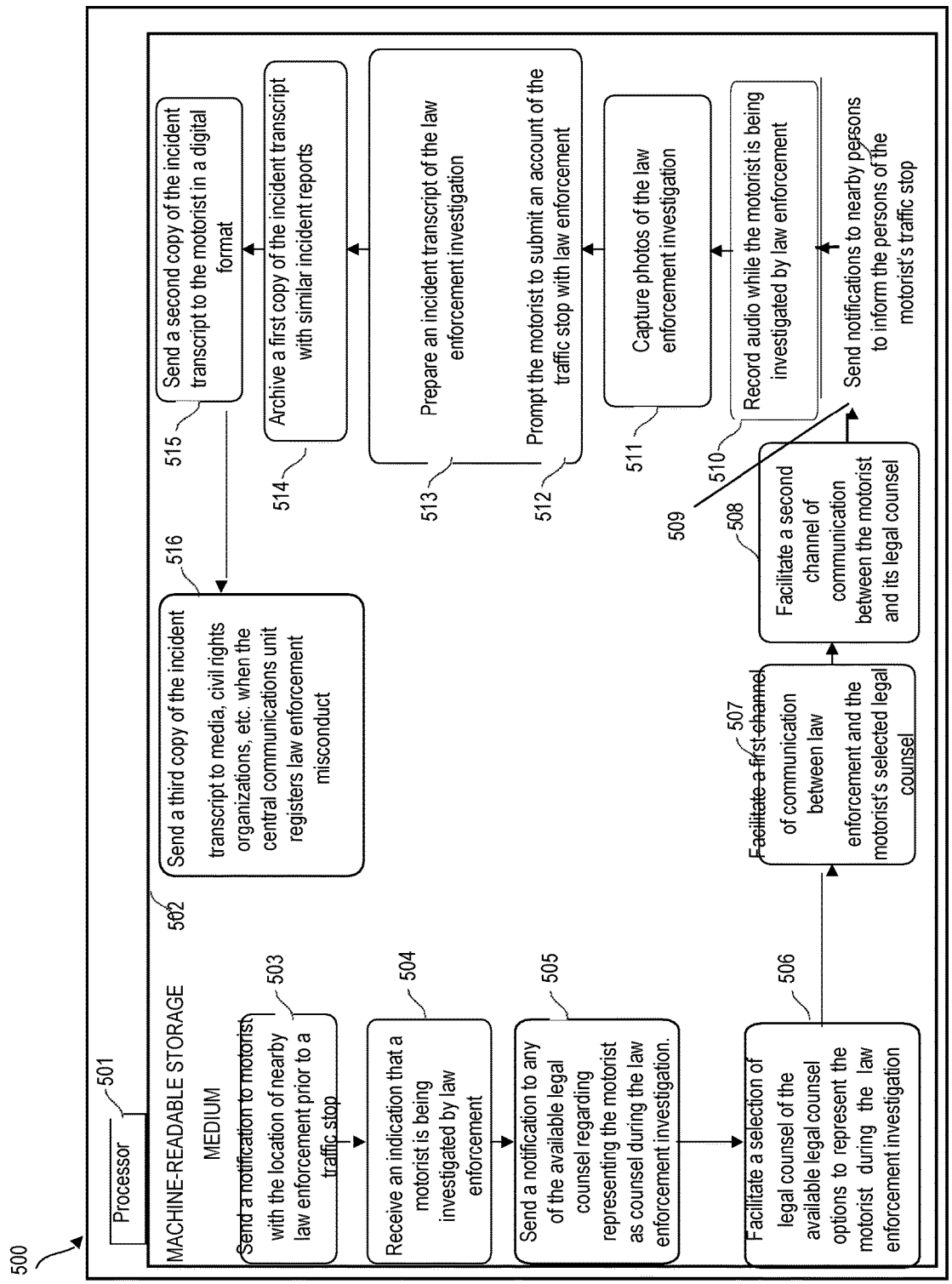
FIG. 5 is an illustration of a computing system which can facilitate a communications system between remote parties during an investigation by law enforcement according to one or more examples of the present invention.

FIG. 5 is an illustration of a computing system 500 which can facilitate a communications system between remote parties during a law enforcement investigation according to one or more examples of the present invention. The computing system 500 may include a non-transitory computer readable medium 502 that includes computer executable instructions 503-516 stored thereon that, when executed by one or more processing units 501 (one processor shown), causes the one or more processing units 501 to effect a communication process consistent with the present invention.

Computer readable medium 502 includes computer executable instructions 503 which include instructions to send notifications to motorists with the location of nearby law enforcement prior to a traffic stop. Next, computer readable medium 502 includes computer executable instructions 504 which include instructions to receive an indication that a motorist is being investigated by law enforcement. Further, computer readable medium 502 may include computer executable instructions 505 which include instructions to send notifications to any of the available legal counsel regarding representing the motorist as counsel during the law enforcement investigation. The notifications may be sent to legal counsel based on counsel profiles (e.g., the location, area of practice, review ratings, etc.). In addition, computer readable medium 502 includes computer executable instructions 506 which include instructions to facilitate a selection of legal counsel of the available legal counsel options to represent the motorist during the law enforcement investigation.

Computer readable medium 502 also includes computer executable instructions 507 which include instructions to facilitate a first channel of communication between law enforcement and the motorist's selected legal counsel. In addition, computer readable medium 502 includes computer executable instructions 508 which include instructions to facilitate a second channel of communication between the motorist and its legal counsel.

Computer readable medium 502 further includes computer executable instructions 509 which include instructions to send notifications to nearby motorists to inform the motorists of the traffic stop. Further, computer readable medium 502 includes computer executable instructions 510 which include instructions to record audio while the motorist is being investigated by law enforcement. Further, computer readable medium 502 includes computer executable instructions 511 which include instructions to capture photos of the law enforcement investigation.

Computer readable medium 502 includes computer executable instructions 512 which include instructions to prompt the motorist to submit an account of the traffic stop with law enforcement. Computer readable medium 502 includes computer executable instructions 513 which include instructions to prepare an incident transcript of the law enforcement investigation that includes an identification (e.g., a driver's license) of the motorist, the motorist's legal counsel, law enforcement, any recorded audio or captured photographs, a timestamp of the investigative stop; and the motorist's account of the law enforcement investigation.

Furthermore, computer readable medium 502 includes computer executable instructions 514 which include instructions to archive a first copy of the incident transcript with similar incident transcripts. Computer readable medium 502 further includes computer executable instructions 515 to send a second copy of the incident transcript to the motorist in a digital format. Further, computer readable medium 502 may include computer executable instructions 516 which include instructions to send a third copy of the incident transcript to media, civil rights organizations, etcetera (e.g., via a social media post) when the central communications unit registers law enforcement misconduct.

The present invention may facilitate the use of machine learning and artificial intelligence technologies to detect trends within the uploaded incident transcripts. For example, the archive of incident transcripts may be processed to discover law enforcement tendencies, regional norms, etcetera. Moreover, the processed data may reveal trends of the interaction between motorists and law enforcement according to race, gender, etcetera. The trend data can be used to improve criminal procedure protocols and the relationship between law enforcement and the public, particularly communities of color.

With the motorists' consent, each incident transcript can be subjected to machine learning with the intent to identify law enforcement investigations which do not conform to the norm. These cases can be further reviewed by legal counsel. If legal counsel determines that the motorists' encounter with law enforcement requires further action, the legal counsel can send a message that a complaint be filed.

While illustrative implementations of the application have been described in detail herein, it is to be understood that the inventive concepts may be otherwise variously embodied and employed, and that the appended claims are intended to be construed to include such variations, except as limited by the prior art.

Reference throughout this specification to "one implementation" or "an implementation" means that a particular feature, structure, or characteristic described in connection with the implementation is included in at least one implementation of the present invention. Thus, the appearances of the phrases "in one implementation" or "in some implementations" in various places throughout this specification are not necessarily all referring to the same implementation. Furthermore, the particular features, structures, or characteristics may be combined in any suitable manner in one or more implementations.

Systems and methods describing the present invention have been described. It will be understood that the descriptions of some embodiments of the present invention do not limit the various alternative, modified, and equivalent embodiments which may be included within the spirit and scope of the present invention as defined by the appended claims. Furthermore, in the detailed description above, numerous specific details are set forth to provide an understanding of various embodiments of the present invention. However, some embodiments of the present invention may be practiced without these specific details. In other instances, well known methods, procedures, and components have not been described in detail so as not to unnecessarily obscure aspects of the present embodiments.

What is claimed is:

1. A non-transitory machine-readable storage medium containing instructions that, when executed:
   send from a first device operated by a motorist to a set of servers an indication that the motorist is being investigated by law enforcement;
   store the indication in computer memory of the set of servers;
   retrieve available legal counsel data that is relevant to a location of the motorist and the law enforcement investigation from the computer memory of the set of servers;
   present options of available legal counsel from the set of servers to the first device operated by the motorist during a law enforcement investigation;
   facilitate a selection of legal counsel from the available legal counsel for the motorist from the available legal counsel options by the first device to represent the motorist during the law enforcement investigation;
   wherein the selection of the legal counsel from the available legal counsel for the motorist is communicated to the set of servers;
   create a first channel of communication between the law enforcement and the motorist's selected legal counsel from the available legal counsel;
   wherein the first channel of communication is created between law enforcement and the selected legal counsel from the available legal counsel via a central communications unit,
   wherein the central communications unit is communicatively coupled to the set of servers and to a set of system devices, and
   create a second channel of communication between the motorist and the selected legal counsel of the available legal counsel via the first device,
   wherein the central communications unit is configured such that when the second channel of communication is open, the first channel of communication is closed such that the motorist can communicate privately with the selected legal counsel of the available legal counsel.

2. The non-transitory machine-readable storage medium of claim 1, further comprising instructions that, when executed, causes at least one of the set of system devices to record audio of the law enforcement investigation.

3. The non-transitory machine-readable storage medium of claim 2, further comprising instructions that, when executed, causes at least one of the set of system devices to capture photos of the law enforcement investigation.

4. The non-transitory machine-readable storage medium of claim 3, further comprising instructions that, when executed, causes at least one of the set of system devices to prompt the motorist to submit a written account of the law enforcement investigation.

5. The non-transitory machine-readable storage medium of claim 4, further comprising instructions that, when executed, causes at least one of the set of system devices to prepare an incident transcript of the law enforcement investigation which includes at least one of a motorist identification, the selected legal counsel of the available legal counsel, a law enforcement identification, the recorded audio, the captured photographs, and an investigation time stamp.

6. The non-transitory machine-readable storage medium of claim 5, further comprising instructions that, when executed, causes at least one of the set of system devices to archive a first copy of the incident transcript.

7. The non-transitory machine-readable storage medium of claim 1, further comprising instructions that, when executed, causes the central communications unit to send notifications to any of the available legal counsel to request to serve as legal counsel for the motorist during the law enforcement investigation in response to receiving the indication that the motorist is being investigated by law enforcement.

8. The non-transitory machine-readable storage medium of claim 1, further comprising instructions that, when executed, causes the central communications unit to receive a request to engage system devices to capture still images and video recordings of a nearby motorist's law enforcement investigation.

9. The non-transitory machine-readable storage medium of claim 1, further comprising instructions that, when executed, causes the central communications unit to send commands to one or more system devices to engage to effect a distress alert in response to receiving a distress signal.

10. The non-transitory machine-readable storage medium of claim 9, wherein the distress signal is an audible command from the motorist.

11. The non-transitory machine-readable storage medium of claim 1, wherein the motorist is a subscriber of a software system deployed by the set of servers which provides access to the available legal counsel for representation during the law enforcement investigation.

12. The non-transitory machine-readable storage medium of claim 1, further comprising instructions that, when executed, causes the central communications unit to send notifications to a contact list associated with the motorist regarding the motorist's present detention during the law enforcement investigation.

13. The non-transitory machine-readable storage medium of claim 1, further comprising instructions that, when executed, causes at least one of the set of system devices to emit a pre-configured audible message that the motorist will be represented by the selected legal counsel during the law enforcement investigation.

14. The non-transitory machine-readable storage medium of claim 1, further comprising instructions that, when executed, causes the central communications unit to send a notification to a witness to the law enforcement investigation to upload at least one of witness notes, photographs, audio files, or video files of the law enforcement investigation.

15. The non-transitory machine-readable storage medium of claim 1, wherein the central communications unit can control the set of system devices.

16. The non-transitory machine-readable storage medium of claim 1, wherein the central communications unit has access to software applications which render a live traffic map.

17. The non-transitory machine-readable storage medium of claim 1, wherein the central communications unit has access to the present location of law enforcement.

18. The non-transitory machine-readable storage medium of claim 1, wherein the central communications unit can establish a network such that the set of servers are communicatively coupled to the set of system devices.

19. The non-transitory machine-readable storage medium of claim 1, wherein the central communications unit is integrated within a vehicle controls system operated by the motorist.

\* \* \* \* \*